Sept. 30, 1952  F. MASTRANGELO  2,612,399
GUIDE PLATE FOR LATCHES
Filed Feb. 2, 1950
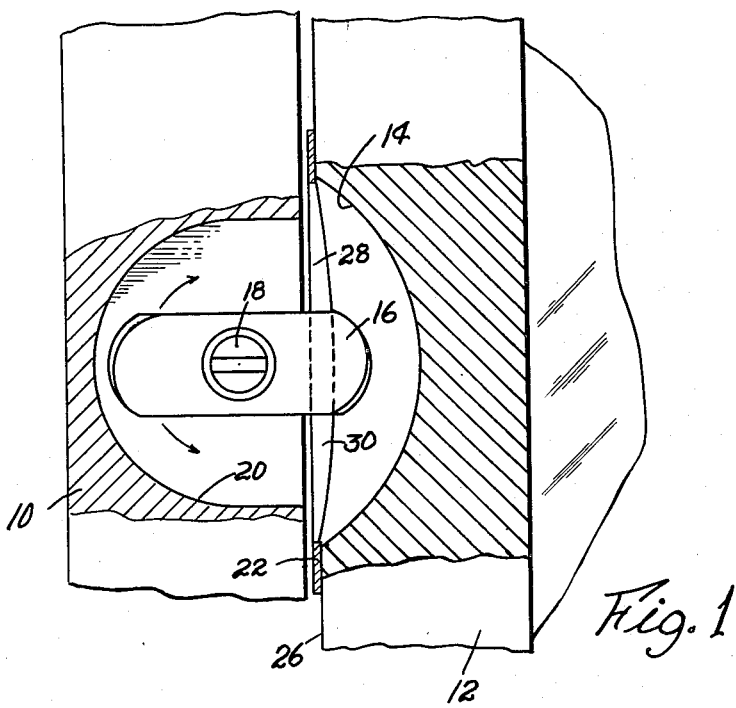
Fig. 1
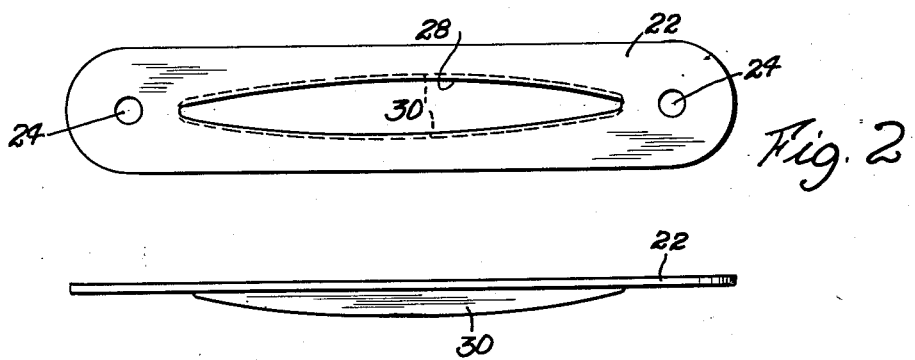
Fig. 2
Fig. 3
INVENTOR.
FRANK MASTRANGELO
BY Charles R. Fay, atty.

Patented Sept. 30, 1952

2,612,399

UNITED STATES PATENT OFFICE 2,612,399

GUIDE PLATE FOR LATCHES

Frank Mastrangelo, Fitchburg, Mass.

Application February 2, 1950, Serial No. 141,930

2 Claims. (Cl. 292—340)

This invention relates to guard and guide plates for movable bolts and the principal object of the invention resides in the provision of a generally flat plate having a narrow elliptical aperture therein longitudinally thereof for a major portion of the length of the plate, said aperture forming a pair of lips which are struck downwardly or away therefrom providing a pair of elliptical flanges both of which extend to the same side of the plate; said plate being adapted to be applied to the slot or aperture provided for the reception of a moving bolt or the like in a member which is adapted to be bolted to another member so that the bolt impinges on the plate or flanges described above and does not impinge upon the sides of the slot in the member which receives the bolt, thus providing wearing means as well as guiding means and guard means in the slot for the bolt.

Other objects and advantages of the invention will appear hereinafter.

Reference is to be had to the accompanying drawings in which

Fig. 1 is a view partly in section illustrating one of the applications for the present guide plate;

Fig. 2 is an enlarged view in elevation thereof; and

Fig. 3 is an edge view of the plate.

Reference is made herein to co-pending application, Serial No. 140,537 filing date January 25, 1950, which shows an alternative form of the guiding and guard plate for the general purpose described.

For purposes of illustration there is shown herein a member 10 comparable to member 10 in the above mentioned application. In any case, this member 10 is adapted to be secured to member 12 which may be similar to member 12 in the above identified case. Member 12 is provided with a saw slot or the like 14 which is adapted to receive a movable bolt 16 pivoted on a member 18 secured to member 10 in a slot 20 therein. It is clear that the bolt 16 may be pivoted into and out of the slot 14 in the member 12. When the bolt 16 is as shown in Fig. 1, i. e., having a part thereof in slot 14, the two members 10 and 12 are secured together; but when the bolt 16 is pivoted in either direction it is wholly removed from slot 14 and the members are no longer secured together.

The plate of the present invention comprises a flat body 22 of elongated form having screw holes 24 therein for securing the same to the edge 26 of member 12 and it is to be noted that the plate 22 may be longer than slot 14 as shown in Fig. 1.

The plate 22 is provided with a central, elongated, narrow, elliptical aperture 28 which aperture is produced to provide a guiding reception for the bolt 16 as clearly shown in Fig. 1. The material left in producing the aperture 28 is bent down in two opposite equal lips forming flanges 30 outlining the aperture 28 and acting as guide and guard means for the bolt 16 as it enters the slot 14.

In the usual case, flanges 30 at their most widely spaced points will engage the sides of the slot 14, and also will prevent the bolt 16 from engaging the sides of the slot. After application of the plate 22 to the desired location, the bolt 16 will force the flanges out of the way and move them into very tight engagement with the sides of the slot 14.

The present invention is particularly useful as a repair plate in cases where prior to application of the plate 22, the side walls of slot 14 have become damaged due to misalignment of the bolt 16 in slot 14 as may happen due to warping of the parts, poor fitting, etc. Merely by applying the plate 22 to the slot 14 as described and shown, and turning the bolt 16 thereinto, the bolt is tightly held and is, in fact, to some extent wedged in place due to the shape of the aperture 28 so that the two members are securely held together without any unwanted play between them.

Having thus described my invention and the advantages thereof, I do not wish to be limited to the details herein disclosed otherwise than as set forth in the claims, but what I claim is:

1. A bolt guiding device comprising an elongated plate having an elongated, central narrow slot therein, and flanges extending from the plate at one side thereof and defining the slot, said flanges firmly impinging upon the side walls defining a narrow opening in a member upon which the bolt guiding device is adapted to be mounted, said flanges being effective to guide a bolt into the opening and guard the side walls of the same against damage by the bolt, said plate slot being elliptical in form and the flanges wedging against the side walls of the said opening in the said member.

2. A bolt guiding device comprising an elongated plate having an elongated central, narrow slot therein, and flanges extending from the plate at one side thereof and defining the slot, said flanges impinging upon the side walls defining a narrow straight-sided elongated opening in a member upon which the bolt guiding device is adapted to be mounted and being effective to guide a bolt into the opening and guard the side walls of the same against damage by means of the bolt, said plate slot being elliptical in form and the flanges tending to resiliently hold the bolt therein at the central portion of the elongated opening.

FRANK MASTRANGELO.

REFERENCES CITED

The following references are of record in the file of this patent:

UNITED STATES PATENTS

| Number | Name | Date |
|---|---|---|
| 276,342 | Billingsley | Apr. 24, 1883 |
| 796,710 | Clark et al. | Aug. 8, 1905 |
| 1,783,150 | Jeffery | Nov. 25, 1930 |
| 2,041,625 | Schmidt | May 19, 1936 |